United States Patent [19]

Kaczur et al.

[11] Patent Number: 5,242,554
[45] Date of Patent: * Sep. 7, 1993

[54] ELECTROLYTIC PRODUCTION OF CHLORIC ACID AND SODIUM CHLORATE MIXTURES FOR THE GENERATION OF CHLORINE DIOXIDE

[75] Inventors: Jerry J. Kaczur; David W. Cawlfield, both of Cleveland; Julian F. Watson, Delano; Cortie J. Rolison, III, Cleveland; Sudhir K. Mendiratta, Cleveland; Robert T. Brooker, Cleveland, all of Tenn.

[73] Assignee: Olin Corporation, Cheshire, Conn.

[ * ] Notice: The portion of the term of this patent subsequent to Jan. 28, 2009 has been disclaimed.

[21] Appl. No.: 958,371

[22] Filed: Oct. 8, 1992

Related U.S. Application Data

[60] Continuation-in-part of Ser. No. 765,078, Sep. 24, 1991, which is a division of Ser. No. 475,603, Feb. 6, 1990, Pat. No. 5,084,148.

[51] Int. Cl.⁵ .......................... C35B 1/14; C01B 11/02
[52] U.S. Cl. ................................... 204/95; 204/101; 423/477; 423/478
[58] Field of Search ................... 204/95, 101; 423/477, 423/478

[56] References Cited

U.S. PATENT DOCUMENTS

| | | | |
|---|---|---|---|
| 3,810,969 | 5/1974 | Schlumberger | 423/472 |
| 4,683,039 | 7/1987 | Twardowski | 204/95 |
| 4,798,715 | 1/1989 | Hardee et al. | 423/478 |
| 4,806,215 | 2/1989 | Twardowski | 204/98 |
| 4,915,927 | 4/1990 | Lipsztajn et al. | 423/472 |
| 4,938,943 | 7/1990 | Norell | 423/479 |
| 4,978,517 | 12/1990 | Norell et al. | 423/479 |
| 4,986,973 | 1/1991 | Svedin et al. | 423/478 |
| 5,002,746 | 3/1991 | Norell | 423/479 |
| 5,064,514 | 11/1991 | Cawlfield et al. | 204/103 |
| 5,084,148 | 1/1992 | Kaczur et al. | 204/95 |
| 5,122,240 | 6/1992 | Cowley et al. | 204/101 |

FOREIGN PATENT DOCUMENTS 92-03374  3/1992  PCT Int'l Appl.

Primary Examiner—John Niebling
Assistant Examiner—Brian M. Bolam
Attorney, Agent, or Firm—James B. Haglind; F. A. Iskander; Louis A. Piccone

[57] ABSTRACT

An aqueous solution of chloric acid and alkali metal chlorate is produced in an electrolytic cell having an anode compartment, a cathode compartment, and at least one ion exchange compartment between the anode compartment and the cathode compartment, in a process which comprises:

a) feeding an aqueous solution of an alkali metal chlorate to the ion exchange compartment, b) passing hydrogen and alkali metal ions from the anode compartment through a cation exchange membrane into the ion exchange compartment, wherein the hydrogen ions displace alkali metal ions to produce an aqueous solution of chloric acid and alkali metal chlorate, c) passing alkali metal ions from the ion exchange compartment into the cathode compartment, d) electrolyzing the aqueous solution of chloric acid and alkali metal chlorate in the anode compartment to produce an aqueous solution of chloric acid, alkali metal chlorate, hydrogen ions and perchlorate ions as a minor constituent.

The aqueous solution of chloric acid, alkali metal chlorate and perchlorate ions is reacted with a reducing agent in a chlorine dioxide generator to produce chlorine dioxide.

24 Claims, 3 Drawing Sheets

ELECTROLYTIC PRODUCTION OF CHLORIC ACID AND SODIUM CHLORATE MIXTURES FOR THE GENERATION OF CHLORINE DIOXIDE

This is a continuation-in-part application of U.S. Ser. No. 07/765,078, filed Sep. 24, 1991 still pending, which is a division of application Ser. No. 7/475,603, filed Feb. 6, 1990, now U.S. Pat. No. 5,084,148 issued Jan. 28, 1992.

FIELD OF THE INVENTION

This invention relates to a process for producing chlorine dioxide from electrochemically produced chloric acid - alkali metal chlorate solutions.

BACKGROUND OF THE INVENTION

Chlorine dioxide has found wide use as a disinfectant in water treatment/purification, as a bleaching agent in pulp and paper production, and a number of other uses due to its high oxidizing power. There is a variety of chlorine dioxide generator systems and processes available in the marketplace. Most of the very large scale generators employed, for example, in pulp and paper production, utilize an alkali metal chlorate salt, a reducing agent, and an acid in a chemical process for producing chlorine dioxide. These generators and the processes employed also produce by-product salts such as sodium chloride, sodium sulfate, sodium sesquisulfate or sodium bisulfate. In pulp and paper mills, the typical by-product is sodium sulfate (saltcake) which is converted into a sulfur salt of sodium in a high temperature boiler and used in the paper process. Boilers require energy and the paper mills have a limited boiler capacity. Increasing the production of chlorine dioxide generally means increased capital investment to provide the added boiler capacity required to process the added amounts of saltcake by-product produced.

Thus a process which reduces the amount of a by-product salt, such as sodium chloride or sodium sulfate, produced while efficiently generating chlorine dioxide is commercially desirable.

U.S. Pat. No. 3,810,969 issued May 14, 1974 to A. A. Schlumberger teaches a process for producing chloric acid by passing an aqueous solution containing from 0.2 gram mole to 11 gram moles per liter of an alkali metal chlorate such as sodium chlorate through a selected cationic exchange resin at a temperature from 5° to 40° C. The process produces an aqueous solution containing from 0.2 gram mole to about 4.0 gram moles of $HClO_3$. This process requires the regeneration of the cationic exchange resin with acid to remove the alkali metal ions and the treatment or disposal of the acidic salt solution.

K. L. Hardee et al, in U.S. Pat. No. 4,798,715 issued Jan. 17, 1989, describe a process for chlorine dioxide which electrolyzes a chloric acid solution produced by passing an aqueous solution of an alkali metal chlorate through an ion exchange resin. The electrolyzed solution contains a mixture of chlorine dioxide and chloric acid which is fed to an extractor in which the chlorine dioxide is stripped off. The ion exchange resin is regenerated with hydrochloric acid and an acidic solution of an alkali metal chloride is formed.

In U.S. Pat. No. 4,683,039, Twardowski et al describe a method for producing chlorine dioxide in which the chlorine dioxide is produced in a generator by the reaction of sodium chlorate and hydrochloric acid. After separating chlorine dioxide gas, the remaining sodium chloride solution is fed to a three-compartment cell to form sodium hydroxide and an acidified liquor which is returned to the chlorine dioxide generator.

Each of the above processes produces a fixed amount and type of by-product salt.

M. Lipsztajn et al, teach an electrolytic-dialytic process for producing chloric acid and sodium hydroxide from sodium chlorate. Chlorate ions are transferred through an anion-exchange membrane and sodium ions are passed through a cation-exchange membrane (U.S. Pat. No. 4,915,927, Apr. 10, 1990).

M. Lipsztajn et al, in PCT application No. WO 92/03374, published Mar. 5, 1992, teach a process for producing a mixture of chloric acid and an alkali metal chlorate by the electrolysis of an alkali metal chlorate solution in the anode compartment of a two-compartment membrane electrolytic cell. A large excess of alkali metal chlorate is present in the mixture to provide a high ratio of alkali metal ions to hydrogen ions. The mixture of chloric acid and an alkali metal chlorate is used to produce chlorine dioxide by chemical or electrochemical reduction.

U.S. Pat. No. 5,122,240 issued Jun. 16, 1992 to G. Cowley et al, describes a process for electrochemically treating a solution containing an alkali metal sulfate and an alkali metal chlorate in the anode compartment of an electrolytic cell. The process produces an acidified solution which is fed to a generator for the production of chlorine dioxide. A high concentration ratio of alkali metal ion to hydrogen ion is maintained. Up to about a 20% reduction in saltcake by product is said to be achieved. The process can employ a plurality of unit cells separated from the adjacent ones by bipolar membranes. A separate electrode rinse solution, such as a sodium sulfate solution is circulated to any additional cells positioned between the cathodic and anodic compartments.

BRIEF SUMMARY OF THE INVENTION

Applicants have now found that the current efficiencies in their novel process for producing chloric acid-alkali metal chlorate solutions can be significantly increased. This improvement is accomplished while maintaining the variability in the composition of the chloric acid-alkali metal chlorate solutions produced, for example, for use in chlorine dioxide generators. These chloric acid/alkali metal chlorate solutions containing perchlorate ions as a minor constituent, are substantially free of other anionic and cationic impurities and are particularly useful in these generators. Further, the process permits a substantial reduction in the amount of undesirable by-products produced by the chlorine dioxide generator system. Still further, the process allows for the production of an alkali metal hydroxide as a valuable by-product or acidic solutions of alkali metal salts at reduced energy costs. In addition, the process results in the reduction of process steps and process equipment required for the production of chlorine dioxide.

These and other advantages are accomplished in a process for electrolytically producing an aqueous solution of chloric acid and alkali metal chlorate in an electrolytic cell having an anode compartment, a cathode compartment, and at least one ion exchange compartment between the anode compartment and the cathode compartment, the process which comprises:

a) feeding an aqueous solution of an alkali metal chlorate into the ion exchange compartment, b) passing hydrogen and alkali metal ions from the anode compartment through a cation exchange membrane into the ion exchange compartment, wherein the hydrogen ions displace alkali metal ions to produce an aqueous solution of chloric acid and alkali metal chlorate, c) passing alkali metal ions from the ion exchange compartment into the cathode compartment, d) electrolyzing the aqueous solution of chloric acid and alkali metal chlorate in the anode compartment to produce an aqueous solution of chloric acid, alkali metal chlorate, hydrogen ions, and perchlorate ions as a minor constituent.

An additional embodiment of the present invention is a continuous process for producing chlorine dioxide which comprises:

a) feeding an aqueous solution of an alkali metal chlorate to an ion exchange compartment of an electrolytic cell having an anode compartment, a cathode compartment, and at least one ion exchange compartment between the anode compartment and the cathode compartment, b) passing hydrogen and alkali metal ions from the anode compartment through a cation exchange membrane into the ion exchange compartment, wherein the hydrogen ions displace alkali metal ions, to produce an aqueous solution of chloric acid and alkali metal chlorate, c) passing alkali metal ions from the ion exchange compartment into the cathode compartment, d) electrolyzing the aqueous solution of chloric acid and alkali metal chlorate in the anode compartment to produce an aqueous solution of chloric acid, alkali metal chlorate, hydrogen ions, and perchlorate ions as a minor constituent, and, e) reacting the aqueous solution of chloric acid, alkali metal chlorate and perchlorate ions with a reducing agent in a chlorine dioxide generator to produce chlorine dioxide.

BRIEF DESCRIPTION OF THE DRAWINGS

More in detail, the novel process of the present invention and its application in producing chlorine dioxide can be carried out in the apparatus illustrated in the following FIGURES.

DETAILED DESCRIPTION OF THE DRAWINGS

Figure 1:
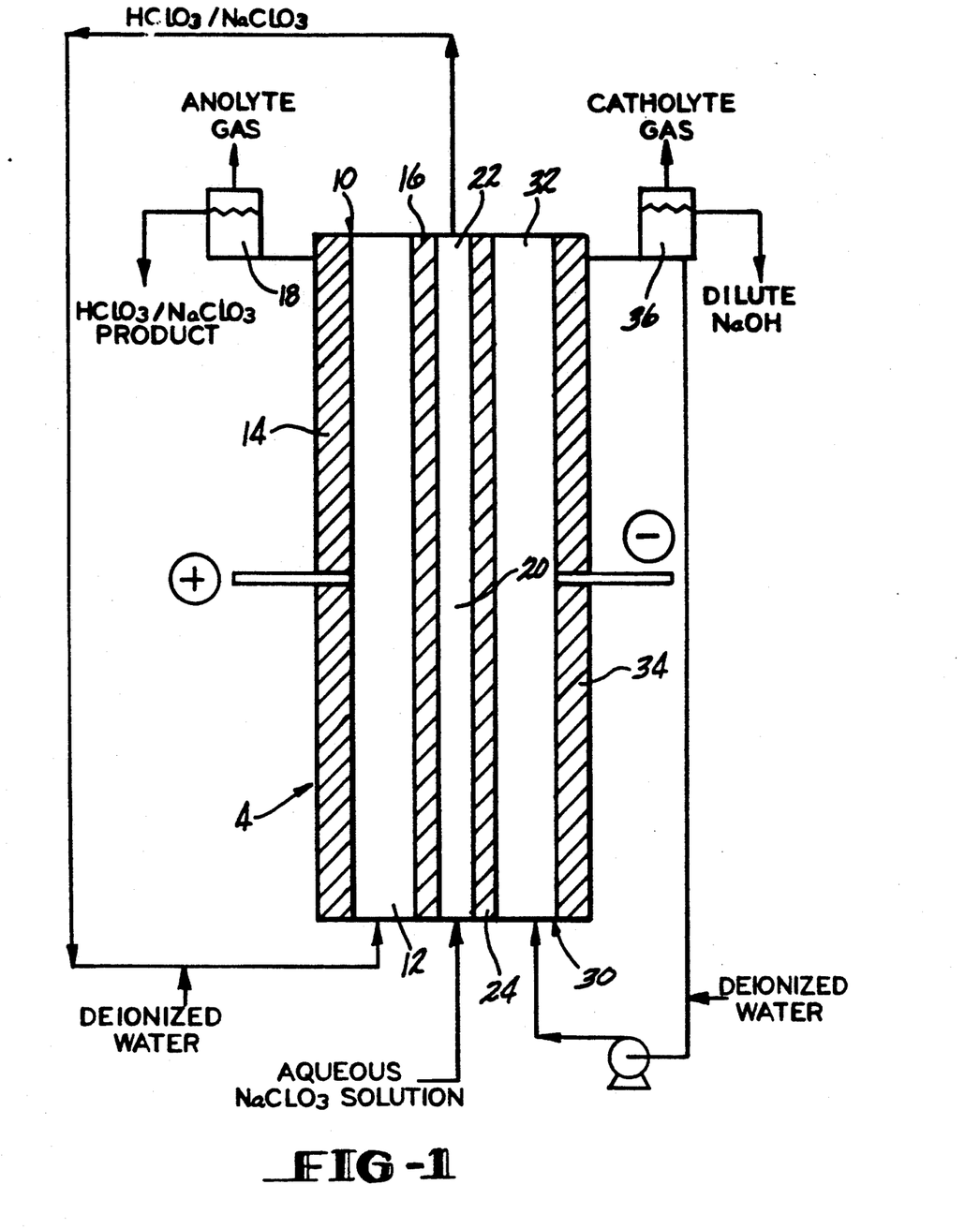
FIG. 1 is a sectional side elevational view of an electrolytic cell which can be employed in the novel process of the present invention.

FIG. 1 shows an electrolytic cell 4 divided into anode compartment 10, ion exchange compartment 20, and cathode compartment 30 by cation permeable ion exchange membranes 16 and 24. Anode compartment 10 includes anode 12, and anode spacer 14. Anode spacer 14 positions porous anode 12 with respect to cation permeable ion exchange membrane 16 and aids in the disengagement of anolyte gas produced. For purposes of simplification, the process of the invention will be described using sodium chlorate as the alkali metal chlorate. The sodium chlorate feed solution enters the lower part of ion exchange compartment 20. Ion exchange compartment 20 includes spacer material 22 which provides a flow channel between cation permeable ion exchange membranes 16 and 24 for the aqueous sodium chlorate solution. During electrolysis, chloric acid is produced and $HClO_3/NaClO_3$ solution flows out of ion exchange compartment 20 into the lower part of anode compartment 10. Sodium ions pass through ion exchange membrane 24 into cathode compartment 30. In anode compartment 10 the $HClO_3/NaClO_3$ solution is electrolyzed to produce a solution containing a higher concentration of chloric acid, reduced concentrations of sodium chlorate and low concentrations of perchlorate ions as well as hydrogen ions and anolyte gases such as oxygen. Hydrogen ions as well as sodium ions pass through cation permeable ion exchange membrane 16 into ion exchange compartment 20. The disengagement of anolyte gas from the solution containing chloric acid, sodium chlorate and perchlorate ions is carried out in anolyte gas disengager 18. Cathode compartment 30 includes cathode 32, and cathode spacer 34. Cathode spacer 34 positions cathode 32 with respect to cation permeable ion exchange membrane 24 and aids in the disengagement of catholyte gas produced. The disengagement of catholyte gas from the, for example, NaOH catholyte solution is accomplished in cathode disengager 36. During cell operation deionized water may be added to the $HClO_3/NaClO_3$ solution fed to anode compartment 10 or to the NaOH catholyte recycled to cathode compartment 30 to adjust solution concentrations.

Figure 2:
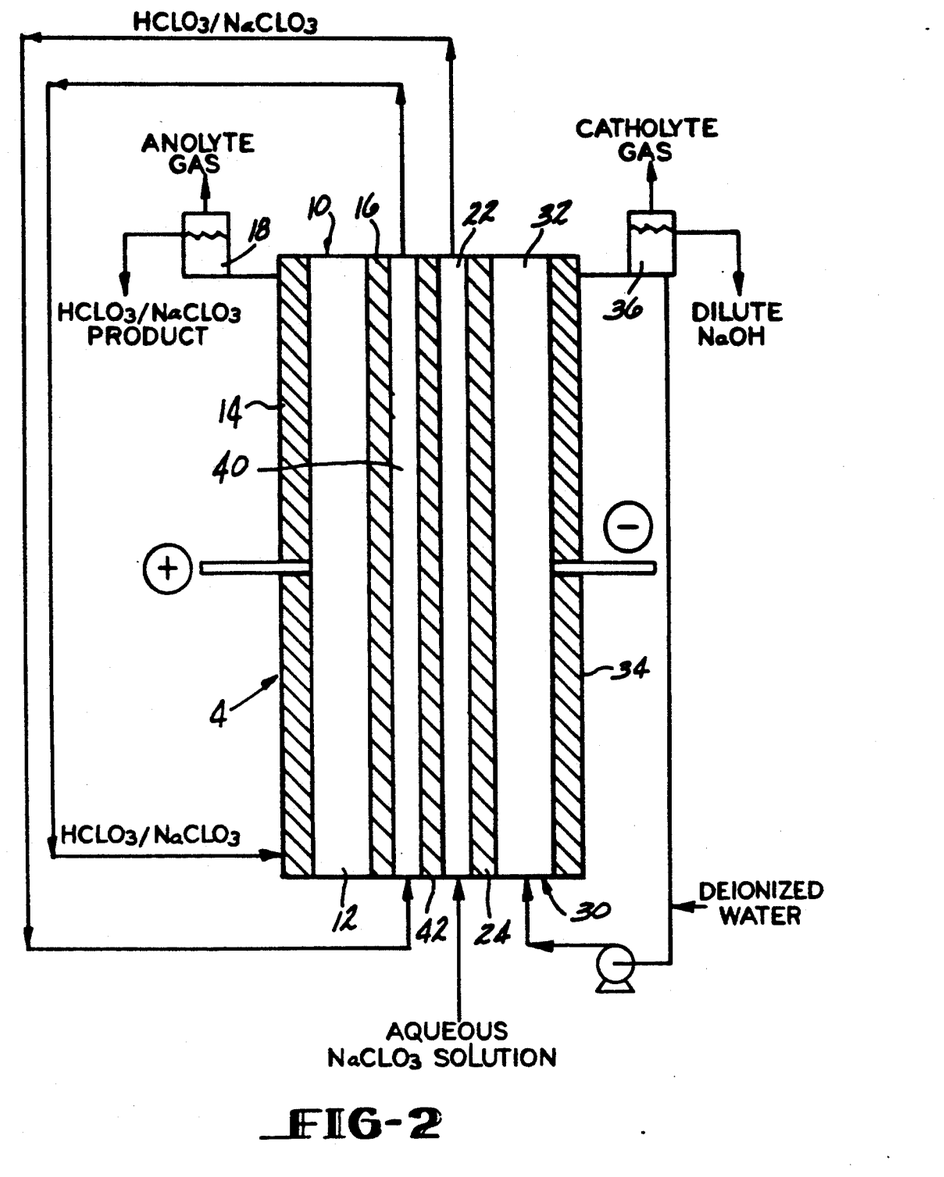
FIG. 2 is a sectional side elevational view of an additional electrolytic cell which can be employed in the process of the present invention.

In FIG. 2, electrolytic cell 4 has been expanded to include a second ion exchange compartment 40 which is positioned between anode compartment 10 and ion exchange compartment 20. Cation permeable ion exchange membrane 16 separates anode compartment 10 from ion exchange compartment 40. The sodium chlorate feed solution enters the lower part of first ion exchange compartment 20, flows upward and out of first ion exchange compartment 20 into the lower part of second ion exchange compartment 40. The $HClO_3/NaClO_3$ solution recovered from the upper part of second ion exchange compartment 40 is fed to the lower part of anode compartment 10. Following electrolysis, the solution containing chloric acid, sodium chlorate and perchlorate ions is removed from the upper part of anode compartment 10 and passed through anolyte disengager 18 to complete the disengagement of anolyte gas from the product solution.

The flow direction in the ion exchange compartments can also be reversed, for example, with the solution from the upper part of first ion exchange compartment 20 being fed to the upper part of second ion exchange compartment 40. The product solution then exits from the lower part of second ion exchange compartment 40.

Figure 3:
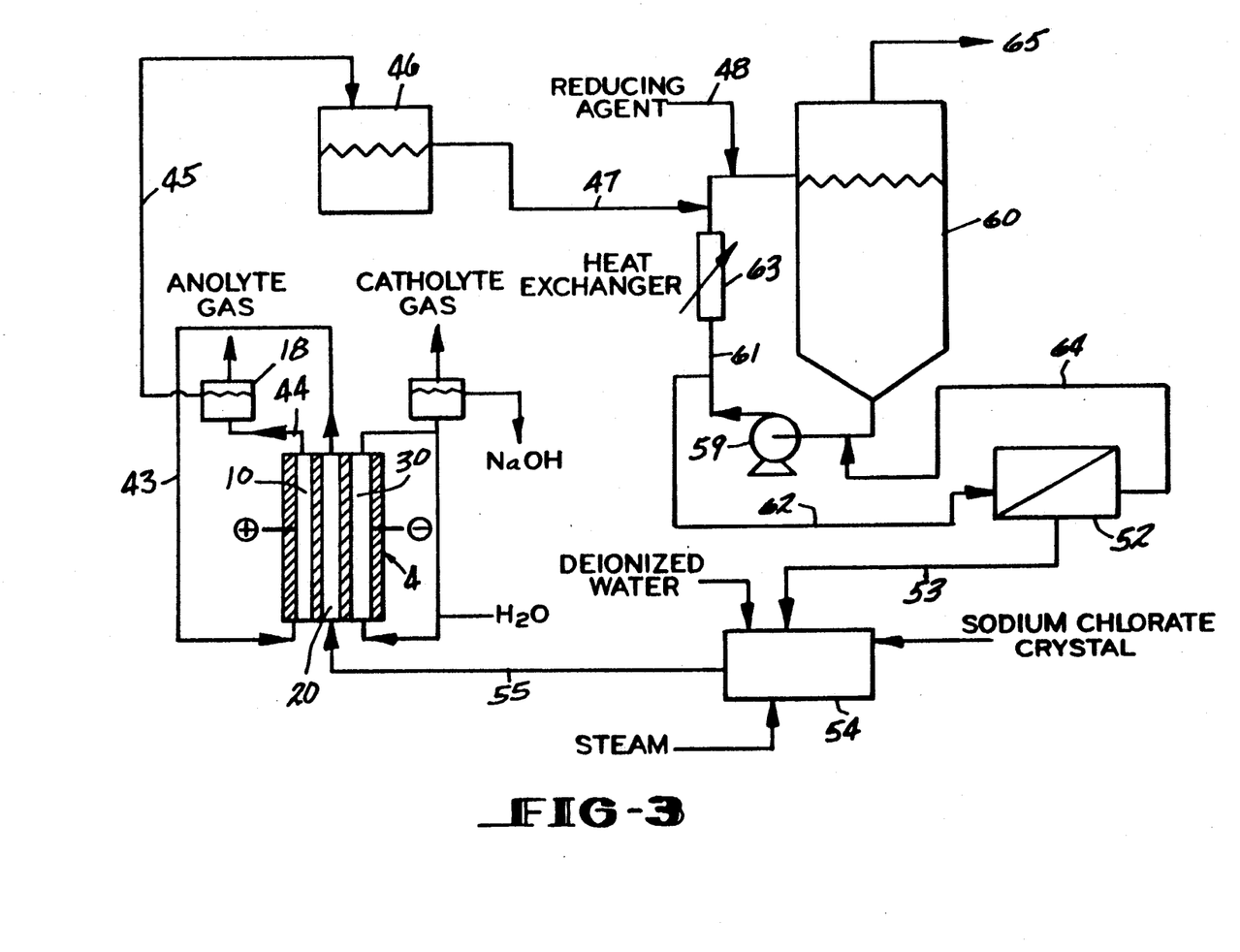
FIG. 3 is a diagrammatic illustration of a system which can be employed in the process of the present invention.

In the continuous process depicted in FIG. 3, the solution containing chloric acid, sodium chlorate and, as a minor constituent, perchlorate ions from anode compartment 10 of electrolytic cell 4 is fed through line 44 to gas disengager 18 and to solution surge or storage tank 46 through line 45. The use of the surge tank 46 is preferred, but not required for process operation. The surge tank isolates electrolytic cell 4 from subatmospheric or superatmospheric process pressures used to operate chlorine dioxide generator 60. The chlorine dioxide generator system consists of chlorine dioxide generator vessel 60 with circulation pump 59, solid/liquid separator 52, and heat exchanger 63. The solution containing chloric acid, sodium chlorate and perchlorate ions from surge tank 46 enters the aqueous solution circulation recycle loop to chlorine dioxide generator 60 through line 47. Reducing agent is added to chlorine dioxide generator 60 through line 48. The chlorine dioxide product, water vapor and by-product gases exit from generator 60 by line 65, preferably under subatmospheric pressure. An aqueous slurry of chloric acid, sodium chlorate, precipitated sodium chlorate, residual reducing agent, perchlorate ions, and any dissolved by-products or impurities are removed from the lower part of generator 60. This slurry is pumped into line 61 where a portion of the slurry enters heat exchanger 63, is heated, and the heated solution is returned to generator 60. Heat exchanger 63 supplies the heat requirement for the evaporation of water vapor which exits with the chlorine dioxide product from generator 60 through line 65. A portion of the generator slurry flow from line 61 is routed to solid/liquid separator 52 by line 62 to separate the Precipitated sodium chlorate from the aqueous solution phase. There are a number of suitable types of separators that can be employed such as centrifuges, belt filters, etc. The aqueous solution from solid/liquid separator 52 is then recycled back into the generator circulation loop via line 64.

The separated sodium chlorate precipitate from separator 52 enters sodium chlorate feed dissolving tank 54 by line 53. Also fed to dissolving tank 54 are crystals of sodium chlorate, such as commercial grade sodium chlorate crystals, as well as deionized water and steam to prepare a concentrated sodium chlorate solution. The dissolving tank also includes means for mixing and agitating as well as for filtering the solution, making it suitable as a feed for $NaClO_3$ solution into ion exchange compartment 20 of electrolytic cell 4 by line 55.

DETAILED DESCRIPTION OF THE INVENTION

The process of the invention, which is preferably operated continuously, is accomplished by electrolytically preparing an aqueous solution of chloric acid - alkali metal chlorate substantially free of anionic and cationic impurities. The chloric acid -alkali metal chlorate solution is produced using an aqueous solution of an alkali metal chlorate which is fed to at least one ion exchange compartment of the electrolytic cell. Suitable alkali metal chlorates include sodium chlorate, potassium chlorate and lithium chlorate. In order to simplify the disclosure, the process of the invention will be described using sodium chlorate, which is a preferred embodiment of the alkali metal chlorates. As shown in FIG. 3, the alkali metal chlorate feed solution may be prepared, for example, by dissolving a crystalline alkali metal chlorate, such as sodium chlorate, in pure or deionized water. Commercial sodium chlorate is suitable as it generally substantially free of significant amounts of sulfate, chloride, hypochlorite, and phosphate ions as anionic impurities. For example, the sulfate content of the chlorate feed solution is preferably less than about 1 wt %. When chloride ion is present in the sodium chlorate feed solution, chlorine dioxide may be spontaneously formed in the ion exchange compartments of the electrolytic cell. Applicants have found that, when present, chlorine dioxide migrates through the membrane into the cathode compartment. In the cathode compartment, chlorine dioxide can disproportionate into chloride and chlorate ions which are undesired impurities in the alkali metal hydroxide product.

The chloride ion content of the aqueous solution of sodium chlorate should be less than about 1.0 wt % and preferably less than about 0.1 wt %. Cationic impurities to be avoided include transition metal ions, such as those of iron, nickel, chromium and vanadium. When present at concentrations of about 1 wt % or greater, these cationic impurities may decompose chlorine dioxide in a generator.

Aqueous sodium chlorate feed solutions which may be employed contain any suitable concentrations up to about saturation at the temperatures at which the solutions are fed to the ion exchange compartment of the electrolytic cell. Thus sodium chlorate solutions having a concentration in the range of from about 0.1% by weight to those saturated with sodium chlorate at temperatures in the range from about 0° C. to about 100° C., and preferably from about 15° C. to about 80° C., may be employed. These sodium chlorate solutions have a concentration in the range from about 0.1% by weight to about 60% by weight of $NaClO_3$, preferably from about 20% to about 55%, and more preferably from about 30% to about 50% by weight of $NaClO_3$.

Where the process is employed in conjunction with a chlorine dioxide generator, the sodium chlorate feed stream may also contain sodium chlorate recovered from the $ClO_2$ generator. In one embodiment, $NaClO_3$ is precipitated in the generator and separated. The separated sodium chlorate precipitate, which can be in the form of small crystals, or more preferably large crystals, is preferably washed, for example, with deionized water. The washing removes residual chloric acid. Rinse wash liquor containing any residual chloric acid is preferably recycled back into the chlorine dioxide generator. However, to control the volume of liquor recycled to the chlorine dioxide generator, the wash solution containing chloric acid may be admixed into the sodium chlorate feed solution. In an alternate embodiment, the liquor from the chlorine dioxide generator may be mixed with make up amounts of sodium chlorate crystals and this solution fed to the ion exchange compartment of the electrolytic cell. The concentration of chloric acid in any alkali metal chlorate solution recycled to the ion exchange compartment is preferably less than about 2 normal, and more preferably less than 1 normal, and most preferably less than 0.5 normal. High concentrations of residual chloric acid in the feed to the ion exchange compartment will lower the electrolytic cell current efficiency, in terms of alkali metal ion removal efficiency, in direct proportion to the chloric acid strength.

The process of the invention utilizes an electrochemical cell to generate hydrogen ions in the anode compartment. The generation of hydrogen ions in the anode compartment, for example, by the oxidation of water on the anode, is accompanied by the formation of oxygen gas as shown by the following electrode reaction:

$$2H_2O \rightarrow O_2 + 4H^+ + 4e^-$$

The anode compartment contains an anolyte, which initially can be an aqueous solution of, for example, sodium chlorate. The hydrogen ions generated in the anode compartment pass through the cation exchange membrane separating the anode compartment from the ion exchange compartment. As a hydrogen ion enters the sodium chlorate solution in the ion exchange compartment, a sodium ion is displaced and by electrical ion mass action passes through the cation membrane adjacent to the cathode compartment to maintain electrical neutrality.

The electrolytic process of the invention as operated results in the conversion of sodium chlorate to chloric acid over a wide range, for example, from about 1% to about 99.9%, preferably from about 5% to about 95%, and more preferably from about 15% to about 90%.

The sodium chlorate feed solution concentration, the residence time in the ion exchange compartment and the naode compartment, as well as the cell amperage are factors that affect the extent of the conversion of sodium chlorate to chloric acid.

Using very dilute solutions of sodium chlorate, high percentages of conversion of $NaClO_3$ to chloric acid can be achieved, i.e., up to 99.9%. For a single pass flow through system, typical residence times in the electrolytic cell are between about 0.1 to about 120 minutes, with a more preferred range of about 0.5 to about 60 minutes.

The electrolytic cell is operated at a current density of from about 0.01 KA/m2 to about 10 KA/m2, with a more preferred range of about 0.05 KA/m2 to about 5 KA/m2.

Adjusting the width of the ion exchange compartment can alter the operating cell voltage and current efficiency. The width, or space between the cation exchange membranes forming the walls of the ion exchange compartment, is in the range of from about 0.1 to about 10, and preferably from about 0.3 to about 5 centimeters.

In an alternate embodiment the ion exchange compartment contains a cation exchange medium. Cation exchange mediums which can be used in the ion exchange compartment include cation exchange resins. Suitable cation exchange resins include those having substrates and backbones of polystyrene based with divinyl benzene, cellulose based, fluorocarbon based, synthetic polymeric types and the like. Where more than one ion exchange compartment is employed, inclusion of the cation exchange medium is optional for each compartment.

Functional cationic groups on these mediums which may be employed include carboxylic acid, sulfonic or sulfuric acids, and acids of phosphorus such as phosphonous, phosphonic or phosphoric. The cation exchange resins are suitably ionically conductive so that a practical amount of current can be passed between the cation exchange membranes used as separators. Various percentage mixtures of resins in the hydrogen form and the sodium form may be used in various sections of the ion exchange compartments on assembly to compensate for the swelling and contraction of resins during cell operation. For example, percentage ratios of hydrogen form to sodium form may include those from 50% to 100%.

The use of cation exchange resins in the ion exchange compartment can serve as an active mediator which can exchange or absorb sodium ions and release hydrogen ions. The hydrogen ions generated at the anode thus regenerate the resin to the hydrogen form, releasing sodium ions to pass into the cathode compartment. Their employment is particularly beneficial when feeding dilute sodium chlorate solutions as they help reduce the cell voltage and increase conversion efficiency.

Preferred as cation exchange mediums are strong acid type cation exchange resins in the hydrogen form as exemplified by low cross-linked resins such as AMBERLITE ® IRC-118 (Rohm and Haas Co.) as well as higher cross-linked resins i.e., AMBERLITE ® IRC-120. High surface area macro-reticular or microporous type ion exchange resins having sufficient ionic conductivity in the ion exchange compartments are also suitable.

Physical forms of the cation exchange resin which can be used are those which can be packed into compartments and include beads, rods, fibers or a cast form with internal flow channels. Bead forms of the resin are preferred.

Cation exchange membranes selected as separators between compartments are those which are inert membranes, and are substantially impervious to the hydrodynamic flow of the alkali metal chlorate solution or the electrolytes and the passage of any gas products produced in the anode or cathode compartments.

Cation exchange membranes are well-known to contain fixed anionic groups that permit intrusion and exchange of cations, and exclude anions from an external source. Generally the resinous membrane or diaphragm has as a matrix, a cross-linked polymer, to which are attached charged radicals such as $-SO_3^-$ and/or mixtures thereof with $-COOH^-$. The resins which can be used to produce the membranes include, for example, fluorocarbons, vinyl compounds, polyolefins, hydrocarbons, and copolymers thereof. Preferred are cation exchange membranes such as those comprised of fluorocarbon polymers or vinyl compounds such as divinyl benzene having a plurality of pendant sulfonic acid groups or carboxylic acid groups or mixtures of sulfonic acid groups and carboxylic acid groups. The terms "sulfonic acid group" and "carboxylic acid groups" are meant to include salts of sulfonic acid or salts of carboxylic acid groups by processes such as hydrolysis.

Preferred cation exchange membranes are those which exclude chlorate ions efficiently and thus prevent the intrusion of chlorate ions into the anode or cathode compartments. Chlorate ion intrusion may be measured as the ratio of moles of chlorate ion migration to the faradays of current passed. This ratio defines a transference number for chlorate ion. For the most preferred membranes, the chlorate transference number is found to be less than about 0.01.

Suitable cation exchange membranes are readily available, being sold commercially, for example, by Ionics, Inc., by Sybron Corp , by E. I. Dupont de Nemours & Co., Inc., under the trademark "NAFION ®", by the Asahi Chemical Co. under the trademark "ACIPLEX ®", Asahi Glass Co. under the trademark "FLEMION ®", and by Tokuyama Soda Co., under the trademark "NEOSEPTA ®". Among these are the perfluorinated sulfonic acid type membranes which are resistant to oxidation and high temperatures such as DuPont NAFION ® types 117, 120, 324, 350, 417, 450, etc., membranes from the assignee of U.S. Pat. No. 4,470,888, and other polytetrafluorethylene based membranes with sulfonic acid groupings such as those sold under the RAIPORE ® tradename by RAI Research Corporation.

The chloric acid/sodium chlorate solution, or a portion thereof, produced in the ion exchange compartment is fed to the anode compartment. Electrolyzing the chloric acid/sodium chlorate solution in the anode compartment produces a higher concentration of chloric acid by the additional displacement of sodium ions from the solution by hydrogen ions generated at the anode. These sodium ions, as well as a quantity of hydrogen ions pass from the anode compartment through the adjoining cation exchange membrane into the ion exchange compartment. The additional sodium ion removal by hydrogen ions results in current efficiencies which are at least 5 to 25% higher than operation without flow of the chloric acid/sodium chlorate solution from the ion exchange compartment into the anode compartment. Also formed during the electrolysis are perchlorate ions as a minor constituent. The perchlorate ion concentration in the chloric acid/sodium chlorate solution product produced in the anode compartment is less than 10 wt %, preferably less than 5 wt %, and more preferably less than 2 wt %. The electrolysis in the anode compartment is preferably operated to minimize the formation of perchlorate ions. The extent of perchlorate ion formation in the anode compartment by the anodic oxidation of chloric acid, or more specifically the chlorate ion, is related to the acid normality of the chloric acid solution in the anolyte, the concentration of chlorate ion in the solution, and anolyte temperature.

In an alternate embodiment, the anolyte compartment employs a pumped recirculation loop. The loop includes a heat exchanger to control anolyte temperature within a range of from about 40° to about 100° C. At these temperatures, perchlorate ion formation is controlled and maximum anode life is achieved.

In addition, the use of anode coatings that minimize the perchlorate formation reaction from chlorate is preferred. Suitable coating types include platinum group metals and their oxides and mixtures thereof. Examples are iridium oxide and platinum coatings on valve metal substrates such as titanium, tantalum, niobium, and zirconium. Optimum coatings may produce a final chloric acid/alkali metal chlorate product solution that is substantially free of cationic and anionic impurities.

Other suitable anodes which may be employed in the anode compartment, include those which are available commercially as dimensionally stable anodes. Preferably, an anode is selected which will generate oxygen gas and include porous or high surface area anodes. As materials of construction for the anodes, metals including platinum, gold, palladium, or mixtures or alloys thereof, or thin coatings of such materials on various substrates such as valve metals, i.e., titanium, can be also be employed. Additionally oxides of iridium, rhodium or ruthenium, and alloys and their mixtures with other platinum group or precious metals could also be employed. Commercially available oxygen evolution anodes of this type include those manufactured by Englehard (PMCA 1500) or Eltech (TIR-2000). Other suitable anode materials include graphite, graphite felt, a multiple layered graphite cloth, a graphite cloth weave, carbon, etc.

The catholyte can be any suitable aqueous solution, including alkali metal chlorides, and acids such as hydrochloric, sulfuric, phosphoric, nitric, acetic or others. In a preferred embodiment, deionized or softened water or sodium hydroxide solution is used as the catholyte in the cathode compartment to produce an alkali metal hydroxide. The water selection is dependent on the desired purity of the alkali metal hydroxide by-product. The cathode compartment may also contain a strong acid cation exchange resin in a cation form such as sodium as the electrolyte.

Any suitable cathode which generates hydrogen gas may be used, including those, for example, based on nickel or its alloys, including nickel-chrome based alloys; steel, including stainless steel types 304, 316, 310, etc.; graphite, graphite felt, a multiple layered graphite cloth, a graphite cloth weave, carbon; and titanium or other valve metals as well as valve metals having coatings which can reduce the hydrogen overvoltage of the cathode. The cathode is preferably perforated or expanded to allow for suitable release of the hydrogen gas bubbles produced at the cathode particularly where the cathode is placed against the membrane.

Optionally a porous spacer material such as a chemically resistant non-conductive plastic mesh or a conductive material like graphite felt can be positioned behind the anode and/or the cathode to support the electrodes and to permit the adjustment of the gap between the electrode and the cation permeable ion exchange membrane, for example, when using high open area expanded metal electrodes. The porous spacer material preferably has large holes for ease of disengagement of the gases from the anolyte and/or catholyte. A thin protective spacer can also be placed between the anode and/or the cathode and the cation permeable ion exchange membranes. This spacer can be a non-conductive plastic or a porous conductive material like graphite felt. The cell may be operated with the electrode in contact with the thin protective spacer and the porous spacer material, or with the membrane in direct contact with the electrode and with or without the porous spacer material.

The product solution contains chloric acid and alkali metal chlorate in a wide range of concentrations and ratios of chloric acid to alkali metal chlorate. For example, the solutions produced can provide molar ratios of chloric acid to alkali metal chlorate of from about 0.1:1 to about 250:1, preferably from about 0.3:1 to about 200:1, and more preferably from about 1:1 to about 100:1. Acid addition is not required for chlorine dioxide generation where sufficient chloric acid is present in the chloric acid/sodium chlorate mixture as it provides the necessary acidity for the reaction to occur with the addition of a reducing agent. Where additional acids are wanted or required, a reduction in the amount of acid employed in the generation of chlorine dioxide is achieved.

In one embodiment, the aqueous solution of chloric acid, sodium chlorate and perchlorate ions, as a minor constituent, is employed in producing chlorine dioxide by feeding the aqueous solution of chloric acid, alkali metal chlorate and perchlorate ions to a chlorine dioxide generator. A selected reducing agent is added to the chlorine dioxide generator to react with the aqueous solution of chloric acid, sodium chlorate and perchlorate ions to produce chlorine dioxide. Suitable reducing agents are inorganic reducing agents such as hydrogen peroxide and alkali metal peroxides i.e, sodium peroxide or potassium peroxide. These inorganic reducing agents do not react with perchlorate ions and do not form permanent or persistent anions which would contaminate the chlorate solution recovered from the chlorine dioxide generator.

A preferred embodiment reacts an aqueous solution of chloric acid and sodium chlorate containing perchlorate ions in the presence of an oxygen-evolving catalyst where water is the reducing agent. The aqueous solution preferably contains about 3.0 molar total acidity or more, is substantially free of anionic and cationic impurities, and has no measurable amounts of chloride ion present. In this process the perchlorate ions promote the reduction of water, which is the reducing agent for producing chlorine dioxide.

The oxygen-evolving catalyst is a solid surface which promotes oxygen evolution. Any solid surface may be used which facilitates oxygen formation, including oxygen-evolving catalysts. Suitable as oxygen-evolving surfaces or catalysts are, for example, metals and oxides of the elements of Group VIII of the Periodic Table of Elements (Webster's Third New International Dictionary of the English Language, Unabridged, 1986, p. 1680). Thus metals, such as the platinum group metals including platinum, palladium, osmium, iridium, rhodium or ruthenium; and mixtures or alloys of these platinum group metals may be employed. Additionally oxides of platinum group metals, such as palladium, osmium iridium, rhodium or ruthenium, as well as mixtures of these oxides with platinum group metals or alloys of these precious metals, could be suitably employed. Likewise, iron alloys, such as stainless steel, nickel or nickel based alloys, and cobalt based alloys, can be used as oxygen-evolving catalysts in the process of the invention. Other oxygen-evolving catalysts include semiconductive ceramics known as perovskites. The catalyst may be present as particles suspended in the reaction mixture or supported on an inert substrate. The oxygen-evolving catalysts may be used in the forms of a packed bed, slurries, or any structure which will suitably promote mass transfer. If desired, a non-oxidizable acid solution, such as perchloric acid, may be added to the aqueous solution of chloric acid and sodium chlorate containing perchlorate ions to increase acidity and the chlorine dioxide generation rate.

A second preferred embodiment is the production of chlorine dioxide by electrolysis of the solution of chloric acid, sodium chlorate and minor amounts of perchlorate ions as the catholyte. This solution can be used, for example in the process described in U.S. Pat. No. 5,089,095, issued Feb. 18, 1992 to D. W. Cawlfield et al. This patent is incorporated by reference in its entirety.

Other Suitable reducing agents for chloric acid/sodium chlorate solutions include organic reducing agents selected from the group of alcohols such as methanol, ethanol, propanol, isopropanol, and higher molecular weight linear and branched alcohols. Other suitable organic reducing agents are selected from the group of carbohydrate sugars such as glucose, sucrose, maltose, and others.

An additional group of organic reducing agents are the water soluble carboxylic acids such as formic acid, oxalic acid, lactic acid and their corresponding alkali metal salts such as sodium formate, sodium oxalate, and sodium lactate. A further group of organic type reducing agents which may be employed are glycols such as ethylene and propylene glycol. Still another group of suitable reducing agents are the aldehydes such as formaldehyde.

The suitable organic reducing agents such as ethylene glycol, carbohydrate sugars, methanol, and other alcohols, will oxidize to form carbon dioxide which exits the generator with the chlorine dioxide and so these do not form persistent anions. During the oxidation of methanol, formic acid is produced as an intermediate prior to being fully oxidized to carbon dioxide. Formic acid may be present as formate ion, but is eventually oxidized and is therefore also not persistent. The perchlorate ions present in combination with the use of organic reducing agents will oxidize the organics to $CO_2$ without the formation of $ClO_2$. This results in additional reducing agent consumption in the $ClO_2$ generator.

Unsatisfactory for use in generating chlorine dioxide, where the production of by-product salts is undesired, are reducing agents which form persistent anions. These include sulfur dioxide, and compounds of sulfur, including sodium thiosulfate, sodium polysulfide, sulfur, thionyl chloride, and sulfonyl chloride, and organic sulfonates, sulfates, and mercaptans. Non-volatile sulfate ions are formed when these reducing agents react with chloric acid or chlorate ions and the sulfate ions persist in the generator. Sulfate ions can reduce the rate of chlorine dioxide generation by buffering or kinetically inhibiting the concentration of available hydrogen ions in the chloric acid - alkali metal solution in the generator for producing chlorine dioxide. The sulfate ions will eventually accumulate in the system such that the alkali metal chlorate precipitate will be largely composed of neutral and then acidic sulfate salts depending on the acid normality in the generator solution.

When the chloric acid - sodium chlorate mixture is used to produce chlorine dioxide, without the addition of another acid, i.e., substantially free of anionic and cationic impurities, it is preferred that the chloric acid concentration in the generator solution be about 0.5 normal or greater, and preferably 1.0 normal or greater. Solutions of these concentrations of $HClO_3$ could be produced directly in the electrochemical cell. However, it may be desirable to concentrate the $HClO_3$ in the product solutions after removal from the cell with the removal or separation of any crystals of the alkali metal chlorate formed during the concentration.

The product solutions may be concentrated, for example, by evaporation at sub-atmospheric pressures and temperatures of less than about 100° C. For example, in the range of from about 30° to about 90° C., and preferably, from about 50° to about 80° C. Solutions containing up to about 50% by weight of chloric acid, and more preferably in the range of from about 30% to about 40% by weight of chloric acid, may be produced in this manner.

Freeze concentration may be used to separate sodium chlorate from the chloric acid solution and thus concentrate the remaining chloric acid simultaneously. As the solution of chloric acid and sodium chlorate is chilled, ice and sodium chlorate will crystallize simultaneously and in separate phases. The solution phase will be enriched in chloric acid and reduced in water content until a eutectic point is reached, at which chloric acid hydrate also crystallizes. This eutectic point is believed to occur at a solution concentration of about 30% to 35% chloric acid by weight.

During the practice of freeze concentration, it is also possible to recycle the melted ice along with the sodium chlorate which dissolves as the ice melts for the purpose of preparing additional sodium chlorate solution for feed to the electrolytic cell in the process of this invention.

An alternative embodiment includes a combination of freeze concentration followed by vacuum evaporation to further concentrate the chloric acid.

Continuously operating the chlorine dioxide generation process permits the co-production of valuable by-products, for example, an alkali metal hydroxide solution such as sodium hydroxide. Further, the process reduces operating costs by eliminating process steps and equipment from processes from those presently commercially available.

During generator operation, the temperature and pressure are related by the boiling point of the solution The operating temperature of the generator should be in the range of from about 30° to 120° C., preferably in the range from about 35° to 110° C. and more preferably in the range of 40° to 100° C. at pressures preferably below atmospheric, in the range of about 30 to 500 mm Hg. Generator operation above atmospheric is possible by methods insuring that the gaseous chlorine dioxide in the generator does not exceed explosive concentrations. Heat addition to the generator is maintained to remove water added to the generator in the chloric acid/sodium chlorate solution feed. This water vapor also serves to dilute the chlorine dioxide to a partial pressure of less than about 70 mm Hg.

The continuous process of the invention is operated such that the sodium chlorate crystals added as make-up to the feed solution to the ion exchange compartment approximates the chlorate consumed in the chlorine dioxide generator. The feed from the electrolytic cell to the generator is preferably saturated with sodium chlorate, and preferably heated to increase solubility to about 45 wt % or greater, more preferably 48 wt % or greater. The ratio of chloric acid to chlorate ion in the electrolytic cell feed to the chlorine dioxide generator is preferred to be 0.5:1 to 1:1 or greater.

Sodium chlorate precipitation in the generator depends on the solubility of the sodium chlorate salt in chloric acid. The salt solubility is highly dependent both on temperature and the chloric acid concentration.

If the generator is operated without precipitation of sodium chlorate, some of the spent generator solution containing both sodium chlorate and chloric acid, of about 0.5 normal or greater, must be recycled so as to minimize waste. Recycling this solution to the ion exchange compartment of the electrolyzer is possible, but not as desirable as sodium chlorate precipitation. The concentration of hydrogen ions in the acidic generator liquor flowing through the ion exchange compartment will preferentially compete with sodium ions and will migrate through the membrane into the cathode compartment. In the cathode compartment hydrogen ions combine with and neutralize hydroxide ions. The net result of is a decrease in the alkali metal removal and thus the current efficiency of the electrolytic cell.

In a further alternative embodiment, the combined electrolytic process and the chlorine dioxide generator can be operated continuously without sodium chlorate precipitation in the generator by employing a separate precipitating vessel. A small slipstream of the generator recirculating liquor is fed to this second vessel in which sodium chlorate is precipitated and separated. The generator recirculating liquor is recycled back to the chlorine dioxide generator. The sodium chlorate precipitate may be employed as described above. One of the advantages of this embodiment is that chlorine dioxide production is increased because of the increase in volume of generator liquor as there is no precipitate in the liquor taking up volume. This embodiment of the process would require more capital equipment and have a higher operating cost, but this is offset by a substantial increase in chlorine dioxide production capacity.

As illustrated in FIG. 3, the product solution can be fed directly from the electrolytic cell to a commercial chlorine dioxide generator. Typical commercial processes are those which use sulfuric acid or hydrochloric acid with a reducing agent such as sulfur dioxide or methanol in the presence of a salt such as sodium chloride. Commercial chlorine dioxide processes which may use the aqueous solutions of chloric acid and alkali metal chlorate of the invention include the Mathieson and modified Mathieson processes, Solvay, R2, R3, R6, R8, R9, R10, Kesting, SVP, SVP-LITE, SVP-HP, and SVP/methanol, among others.

To further illustrate the invention the following examples are provided without any intention of being limited thereby. All parts and percentages are by weight unless otherwise specified.

EXAMPLE 1

An electrochemical cell was constructed similar to that of FIG. 1 consisting of three compartments. The anolyte and catholyte compartments were machined from 1 inch (2.54 cm) thick natural polyvinylidene difluoride (PVDF). The outside dimensions of both the anolyte and catholyte compartments were 5 inches (12.7 cm) by 14 inches (35.56 cm) with machined internal dimensions of 3 inches (7.62 cm) by 12 inches (30.48 cm) by 0.250 inch (0.635 cm) deep. Flow entry and exit ports as well as flow distributions holes were drilled from the outside of the frame to the central recess area for flow into and out of the compartments.

The ion exchanging compartment was machined from 1 inch (2.54 cm) thick natural PVDF with outside dimensions of 5 inch (12.7 cm) by 16 inch (40.64 cm) to a ⅛" (0.3175 cm) by 5 inch (12.7 cm) by 14 inch (35.56 cm) thick center area with a central 3 inch (7.62 cm) by 13 inch (33.02 cm) area cutout. The 1 inch (2.54 cm) by 1 inch top and bottom ends were drilled with a single central hole to form entry/exit ports and tapped to accept ¼ inch NPT pipe thread fittings. A series of 0.055 inch (0.1397 cm) holes were drilled every ½ inch (1.27 cm) from the central cutout area into the flow distribution hole in the 1 inch (2.54 cm) by 1 inch entry/exit ends of the ion exchanging compartment frame. These flow distribution holes go through the ⅛ inch thickness of the central part of the frame.

The anolyte compartment was fitted with an open diamond pattern nonflattened expanded titanium electrode with an iridium oxide based coating (TIR-2000, Eltech Research Corp.) with a 0.060 inch (0.1524 cm) thickness. A ½ inch (1.27 cm) wide by 12 inch (30.48 cm) long by 1/16 inch (0.0625 cm) thick titanium current distributor strip was welded at multiple points to the backside of the expanded titanium sheet.

Two ½ inch (1.27 cm) diameter titanium current conductor posts were then welded to the back side of the flat titanium current distribution strip. The anode structure was then mounted into the recess inside the anolyte compartment using one or more layers of 1/16 inch (0.1588 cm) thick expanded polytetrafluorethylene mesh behind the anode to make the anode surface flush with the inside surface of the anolyte compartment.

The catholyte compartment was fitted with a 1/16 inch (0.1588 cm) thick by 3 inch (7.62 cm) by 12 inch (30.48 cm) type 316L stainless steel perforated plate. A ½ inch (1.27 cm) wide by 12 inch (30.48 cm) long by 1/16 inch (0.0625 cm) thick type 316L stainless current distributor strip was welded at multiple points to the backside of the perforated stainless sheet. Two ½ inch (1.27 cm) diameter 316L stainless conductor posts were then welded on the back side. The cathode plate was mounted in the recess inside the catholyte compartment using two layers of 1/16 inch (0.1588 cm) thick expanded polytetrafluoroethylene mesh behind the cathode plate to make the cathode surface flush with the inside surface of the catholyte compartment.

The electrochemical cell assembly was completed using 0.040 inch (0.1016 cm) thickness polytetrafluoroethylene compressible GORE-TEX gasket tape (W. L. Gore & Associates, Elkton, Md.) on the sealing surfaces of all the compartment cell frames. Two layers of a loose woven polytetrafluoroethylene filament screens with a 1/16 inch (0.1588 cm) thickness were laid in place in the central ion exchange compartment to provide for flow distribution and physical formation of the flow channel.

A DuPont NAFION 417 perfluorinated sulfonic acid cation permeable type membrane was mounted between the central ion exchange compartment and the adjoining anolyte compartment. An experimental Asahi Chemical sulfonic acid based perfluorinated type membrane was mounted on the other side of the ion exchange compartment adjoining the catholyte compartment.

The above cell was operated with a 47.19 wt % sodium chlorate solution made from commercial grade sodium crystal and deionized water. The sodium chlorate solution was fed at a flowrate of 16.7 gm/min into the bottom of the central ion exchange compartment. Deionized water was metered into the catholyte recirculation flow at a flowrate of 10.6 gm/min. A 10 wt % NaOH catholyte was used on cell start-up. The catholyte recirculation used the hydrogen gas lift effect for catholyte recirculation instead of a pump. The catholyte product stream entered the catholyte disengager where the hydrogen is separated from the catholyte dilute caustic product.

The chloric acid/sodium chlorate mixture from the ion exchange compartment was routed to the bottom of the anolyte compartment. The anolyte product and oxygen gas entered the anolyte disengager where oxygen gas was separated from the anolyte product flow.

The applied cell current was 69.3 amperes at a current density of 3 KA/m$^2$ with a cell voltage of about 4.79 volts. A slightly yellow chloric acid/sodium chlorate product solution exited the anolyte compartment at a temperature of about 77° C. The ion exchange compartment output temperature was about 68° C. and the catholyte output temperature was about 68° C. The anolyte product from the cell on cooling in a collection flask formed chlorate crystals because the solubility limit of sodium chlorate in chloric acid was exceeded. This was because the water content of the solution was depleted sufficiently by transport from the central ion exchange compartment into the catholyte with sodium and hydrogen ions, and from the loss of water in the anolyte compartment because of the electrolysis of water in forming oxygen.

After cell operation was at steady state, the anolyte and catholyte product streams were collected and weighed for a period of one hour for current efficiency determination. The product solutions were then weighed and analyzed. The average anolyte output flow was 14.11 gm/min and the catholyte flow was 12.83 gm/min.

The anolyte product solution had a composition of 16.67 wt % HClO$_3$ with 33.06 wt % NaClO$_3$; with a 42.39 wt % total as chlorate ion ClO$_3^-$. The anolyte product was found to also have a perchloric ion (ClO$_4^-$) concentration of about 1.15 wt % by ion chromatography analysis. The catholyte product had a composition of 9.81 wt % as NaOH with a 0.36 wt % NaClO$_3$ content.

The calculated cell operating current efficiency was 64.6% based on the anolyte chloric acid content and 73.0% based on the NaOH product.

EXAMPLE 2

The same cell as used in Example 1 was employed. In operating the process, the sodium chlorate feed solution was initially routed into the bottom of the anode compartment of the cell. The chlorate solution from the anode compartment was fed into the anolyte disengager to disengage the oxygen gas. The chlorate solution from the disengager was initially routed to the bottom of the ion exchange compartment and the chloric acid/sodium chlorate product removed from the top of the ion exchange compartment.

The cell was operated with 47.19 wt % sodium chlorate solution made from commercial grade sodium crystal and deionized water. The sodium chlorate solution was fed at a flowrate of 16.7 gm/min into the bottom of the anode compartment. Deionized water was metered into the catholyte recirculation loop at a flowrate of 10.6 gm/min. A 10 wt % NaOH catholyte was used on cell start-up. The catholyte recirculation used the hydrogen gas lift effect for catholyte recirculation instead of a pump. The catholyte product stream entered the catholyte disengager where hydrogen was separated from the catholyte dilute caustic product.

The chloric acid/sodium chlorate mixture produced in the ion exchange compartment was routed to the bottom of the anolyte compartment. The anolyte product and oxygen gas entered the anolyte disengager where oxygen gas was separated from the anolyte product flow.

The applied cell current was 69.3 amperes at a current density of 3 KA/m2 with a cell voltage of about 4.80 volts. The chloric acid/sodium chlorate product solution, which exited the ion exchange compartment at a temperature of about 68° C., was more yellow than chloric acid/sodium chlorate product solution produced in Example 1. The intermediate product temperature from the anode compartment before entering the ion exchange compartment was about 78° C. The catholyte output temperature was about 69° C.

The ion exchange compartment product solution formed chlorate crystals on cooling in a product collection flask because the solubility limit of sodium chlorate in the chloric acid was exceeded. This was because the water content of the solution in the central ion exchange compartment was depleted by transport with sodium and hydrogen ions into the catholyte, and from the loss of water transport into the ion exchange compartment from the anolyte compartment because of the electrolysis of water in forming oxygen.

After cell operation was at steady state, the anolyte and catholyte product streams were collected for a period of one hour for current efficiency determination. The product solutions were then weighed and analyzed. The average ion exchange product solution output flow was 14.95 gm/min and the catholyte flow was 11.74 gm/min.

The product solution had a composition of about 10.11 wt % HClO$_3$ with 36.77 wt % NaClO$_3$ with a 38.82 wt % total as chlorate ion ClO$_3^-$. The product was found to also have a perchloric ion (ClO$_4^-$) concentration of about 0.72 wt % by ion chromatography analysis. The catholyte product had a composition of 7.78 wt % as NaOH with a 0.44 wt % NaClO$_3$ content. A sample of the intermediate product from the anolyte compartment to the ion exchange compartment had 11.49 wt % HClO₃ content with 1.00 wt % ClO₄⁻ as determined by ion chromatography analysis.

The calculated cell operating current efficiency was 41.5% based on the chloric acid content, and 46.2% based on the NaOH product.

What is claimed is:

1. A process for electrolytically producing an aqueous solution of chloric acid and alkali metal chlorate in an electrolytic cell having an anode compartment, a cathode compartment, and at least one ion exchange compartment between the anode compartment and the cathode compartment, the process which comprises:
   a) feeding an aqueous solution of an alkali metal chlorate to the ion exchange compartment,
   b) passing hydrogen and alkali metal ions from the anode compartment through a cation exchange membrane into the ion exchange compartment, wherein the hydrogen ions displace alkali metal ions to produce an aqueous solution of chloric acid and alkali metal chlorate,
   c) passing alkali metal ions from the ion exchange compartment into the cathode compartment,
   d) electrolyzing the aqueous solution of chloric acid and alkali metal chlorate in the anode compartment to produce an aqueous solution of chloric acid, alkali metal chlorate, hydrogen ions and perchlorate ions as a minor constituent.

2. The process of claim 1 in which the alkali metal chlorate is selected from the group consisting of sodium chlorate, potassium chlorate, and lithium chlorate.

3. The process of claim 2 in which the alkali metal chlorate is sodium chlorate.

4. The process of claim 1 in which the conversion of alkali metal chlorate to chloric acid in the ion exchange compartment is in the range of from about 1 to about 99.9 percent.

5. The process of claim 1 in which the ion exchange compartment contains a cation exchange medium in the hydrogen form.

6. The process of claim 1 in which the catholyte is water or an alkali metal hydroxide solution.

7. The process of claim 1 in which the residence time in the electrolytic cell is from about 0.1 to about 120 minutes.

8. The process of claim 1 in which the current density is from about 0.1 to about 10 KA/m².

9. The process of claim 3 in which the perchlorate ion concentration in the aqueous solution of chloric acid, alkali metal chlorate, and perchlorate ions is less than about 10 wt %.

10. The process of claim 1 in which the cathode compartment contains a cation exchange medium in the alkali metal form.

11. The process of claim 1 in which the ion exchange compartment contains a cation exchange medium in the hydrogen and sodium form.

12. The process of claim 1 in which the chloric acid and the alkali metal chlorate solution produced in the ion exchange compartment is fed to a second ion exchange compartment, the second ion exchange compartment being positioned between and separated from the anode compartment and the first ion exchange compartment.

13. A continuous process for producing chlorine dioxide which comprises:
   a) feeding an aqueous solution of an alkali metal chlorate to an ion exchange compartment of an electrolytic cell having an anode compartment, a cathode compartment, and at least one ion exchange compartment between the anode compartment and the cathode compartment,
   b) passing hydrogen and alkali metal ions from the anode compartment through a cation exchange membrane into the ion exchange compartment, wherein the hydrogen ions displace alkali metal ions to produce an aqueous solution of chloric acid and alkali metal chlorate,
   c) passing alkali metal ions from the ion exchange compartment into the cathode compartment,
   d) electrolyzing the aqueous solution of chloric acid and alkali metal chlorate in the anode compartment to produce an aqueous solution of chloric acid, alkali metal chlorate, hydrogen ions and perchlorate ions as a minor constituent, and,
   e) reacting the aqueous solution of chloric acid, alkali metal chlorate and perchlorate ions with a reducing agent in a chlorine dioxide generator to produce chlorine dioxide.

14. The process of claim 13 in which the perchlorate ion concentration in the aqueous solution of chloric acid, alkali metal chlorate, and perchlorate ions is less than about 10 wt %.

15. The process of claim 14 in which the chloric acid concentration in the aqueous solution of chloric acid, alkali metal chlorate, and perchlorate ions is about 0.5 normal or greater.

16. The process of claim 13 in which the reducing agent is hydrogen peroxide or an alkali metal peroxide.

17. The process of claim 13 in which the reducing agent is an organic reducing agent is selected from the group consisting of alcohols, carbohydrate sugars, water soluble carboxylic acids, glycols, and aldehydes.

18. The process of claim 13 in which the reducing agent is water in the presence of an oxygen-evolving catalyst.

19. The process of claim 18 in which the oxygen evolving catalyst is a metal, an oxide and mixtures thereof of the elements of Group VIII of the Periodic Table of Elements.

20. The process of claim 19 in which the elements of Group VIII are platinum group metals.

21. The process of claim 20 in which the Platinum group metals are selected from the group consisting of iridium, rhodium or ruthenium.

22. The process of claim 18 in which the oxygen evolving catalyst is selected from the group consisting of an oxide or iridium, rhodium or ruthenium or a mixture of the oxide with platinum group metals or alloys of platinum group metals.

23. The process of claim 13 in which the perchlorate ion concentration is less than about 5 weight %.

24. The process of claim 13 in which the perchlorate ion concentration is less than about 2 weight %.

* * * * *